United States Patent
Plondke et al.

(10) Patent No.: US 10,289,412 B2
(45) Date of Patent: May 14, 2019

(54) FLOATING POINT CONSTANT GENERATION INSTRUCTION

(75) Inventors: Erich James Plondke, Austin, TX (US); Lucian Codrescu, Austin, TX (US); Charles Joseph Tabony, Austin, TX (US); Swaminathan Balasubramanian, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1174 days.

(21) Appl. No.: 13/369,693

(22) Filed: Feb. 9, 2012

(65) Prior Publication Data

US 2013/0212357 A1 Aug. 15, 2013

(51) Int. Cl.
*G06F 9/30* (2018.01)
(52) U.S. Cl.
CPC ...... *G06F 9/30014* (2013.01); *G06F 9/30025* (2013.01); *G06F 9/30032* (2013.01); *G06F 9/30167* (2013.01)
(58) Field of Classification Search
CPC .... G06F 9/3016; G06F 9/30145; G06F 5/012; G06F 9/30167; G06F 9/30014; G06F 9/30032; G06F 9/00–3897; G06F 15/00–825
USPC ................. 708/495–522; 712/208, 220–222
See application file for complete search history.

(56) References Cited

U.S. PATENT DOCUMENTS

| 5,201,056 A * | 4/1993 | Daniel et al. ................. 712/41 |
| 5,341,320 A * | 8/1994 | Trissel ................... G06F 7/483 708/498 |
| 5,671,105 A | 9/1997 | Sugawara et al. |
| 5,805,475 A * | 9/1998 | Putrino ................. G06F 7/483 708/204 |

(Continued)

FOREIGN PATENT DOCUMENTS

| CN | 101685383 A | 3/2010 |
| CN | 201628951 U | 11/2010 |

(Continued)

OTHER PUBLICATIONS

IEEE Std 754-2008—IEEE Standard for Floating-Point Arithmetic (p. 6 through 13).*

(Continued)

*Primary Examiner* — Keith E Vicary
(74) *Attorney, Agent, or Firm* — Muncy, Geissler, Olds & Lowe, P.C./Qualcomm

(57) ABSTRACT

Systems and methods for generating a floating point constant value from an instruction are disclosed. A first field of the instruction is decoded as a sign bit of the floating point constant value. A second field of the instruction is decoded to correspond to an exponent value of the floating point constant value. A third field of the instruction is decoded to correspond to the significand of the floating point constant value. The first field, the second field, and the third field are combined to form the floating point constant value. The exponent value may include a bias, and a bias constant may be added to the exponent value to compensate for the bias.

(Continued)

The third field may comprise the most significant bits of the significand. Optionally, the second field and the third field may be shifted by first and second shift values respectively before they are combined to form the floating point constant value.

12 Claims, 3 Drawing Sheets

(56) References Cited

U.S. PATENT DOCUMENTS

| | | | | |
|---|---|---|---|---|
| 5,838,984 | A * | 11/1998 | Nguyen et al. | 712/5 |
| 5,878,266 | A * | 3/1999 | Goddard et al. | 712/23 |
| 5,940,311 | A | 8/1999 | Dao et al. | |
| 5,991,531 | A * | 11/1999 | Song et al. | 703/26 |
| 6,058,465 | A * | 5/2000 | Nguyen | 712/7 |
| 6,122,721 | A * | 9/2000 | Goddard et al. | 712/23 |
| 6,397,239 | B2 * | 5/2002 | Oberman et al. | 708/505 |
| 6,487,653 | B1 * | 11/2002 | Oberman et al. | 712/222 |
| 6,509,022 | B2 * | 1/2003 | Lowry et al. | 424/401 |
| 6,519,694 | B2 * | 2/2003 | Harris | 712/220 |
| 7,003,539 | B1 * | 2/2006 | Purcell | 708/497 |
| 7,212,959 | B1 * | 5/2007 | Purcell et al. | 703/13 |
| 7,330,864 | B2 * | 2/2008 | Yuval et al. | 708/208 |
| 7,885,992 | B2 | 2/2011 | Richey et al. | |
| 7,885,995 | B2 * | 2/2011 | Barrett et al. | 709/202 |
| 7,949,696 | B2 * | 5/2011 | Ishii et al. | 708/204 |
| 8,006,078 | B2 * | 8/2011 | Lee et al. | 712/233 |
| 8,024,678 | B1 * | 9/2011 | Taylor et al. | 716/100 |
| 8,051,117 | B2 * | 11/2011 | Lundvall et al. | 708/204 |
| 8,185,723 | B2 * | 5/2012 | Norin et al. | 712/221 |
| 8,244,783 | B2 * | 8/2012 | Boersma et al. | 708/211 |
| 8,412,756 | B1 * | 4/2013 | Langhammer | 708/201 |
| 8,635,257 | B2 * | 1/2014 | Lundvall et al. | 708/204 |
| 8,645,449 | B1 * | 2/2014 | Langhammer | 708/505 |
| 8,650,231 | B1 * | 2/2014 | Langhammer | 708/204 |
| 8,706,790 | B1 * | 4/2014 | Langhammer | 708/513 |
| 8,745,111 | B2 * | 6/2014 | Ollmann | 708/204 |
| 2001/0051969 | A1 * | 12/2001 | Oberman et al. | 708/514 |
| 2002/0184282 | A1 | 12/2002 | Yuval et al. | |
| 2003/0200244 | A1 | 10/2003 | Abraham et al. | |
| 2005/0154773 | A1 | 7/2005 | Ford et al. | |
| 2006/0112160 | A1 | 5/2006 | Ishii et al. | |
| 2007/0203967 | A1 | 8/2007 | Dockser et al. | |
| 2007/0240129 | A1 * | 10/2007 | Kretzschmar et al. | 717/136 |
| 2007/0252733 | A1 | 11/2007 | Thebault et al. | |
| 2008/0256346 | A1 * | 10/2008 | Lee et al. | 712/239 |
| 2008/0270500 | A1 | 10/2008 | Lundvall et al. | |
| 2008/0270506 | A1 * | 10/2008 | Lundvall et al. | 708/495 |
| 2009/0249040 | A1 * | 10/2009 | Fujimoto et al. | 712/222 |
| 2011/0055307 | A1 * | 3/2011 | Hurd | G06F 7/49947 708/497 |
| 2011/0125987 | A1 * | 5/2011 | Plondke et al. | 712/208 |
| 2012/0079251 | A1 * | 3/2012 | Gradstein et al. | 712/221 |
| 2012/0191955 | A1 * | 7/2012 | Jonsson et al. | 712/222 |
| 2013/0081013 | A1 * | 3/2013 | Plondke et al. | 718/1 |
| 2013/0151577 | A1 * | 6/2013 | Carter et al. | 708/209 |
| 2013/0212357 | A1 * | 8/2013 | Plondke et al. | 712/208 |
| 2013/0246491 | A1 * | 9/2013 | Panda et al. | 708/204 |
| 2014/0067894 | A1 * | 3/2014 | Plondke et al. | 708/501 |

FOREIGN PATENT DOCUMENTS

| | | |
|---|---|---|
| JP | 2006154979 A | 6/2006 |
| KR | 20100010473 A | 2/2010 |
| WO | 9712317 A1 | 4/1997 |

OTHER PUBLICATIONS

"ARM Architecture Reference Manual", Jul. 2005, Issue I, pp. A5-1 to A5-17.*
Florian Kainz, Rod Bogart, "OpenEXR Documentation: Technical Introduction." Industrial Light & Magic. Last Update: Feb. 18, 2009, Url: http://www.openexr.com/documentation.html.
International Search Report and Written Opinion—PCT/US2013/025401—ISA/EPO—May 13, 2013.

* cited by examiner

FLOATING POINT CONSTANT GENERATION INSTRUCTION

FIELD OF DISCLOSURE

Disclosed embodiments are directed to floating point operations. More particularly, exemplary embodiments are directed to instructions for generating commonly used floating point constants.

BACKGROUND

Floating point representations of numbers are useful in computing systems for supporting a wider range of values than can be supported in integer or fixed point formats. In floating point numbers, the radix point (decimal/binary) is allowed to "float," which makes it possible to encode a wide range of values using a small number of bits. Because of the wide range, many floating point numbers may not be effectively represented in fixed point formats without a serious loss of precision or sometimes, errors/exceptions.

Some modern processors support floating point instructions which may operate on numbers represented in floating point format. Integrating floating point instructions in integer/fixed point processor pipelines presents challenges. For example, the potential loss of precision poses challenges in encoding floating point constants or immediate values in floating point instructions.

Traditional instruction set architectures (ISA) for computer processors commonly include instructions which specify an immediate value. Usually, instructions which specify an immediate value contain the immediate value within the instruction itself, in a designated field of the instruction. The number of bits available for immediate value fields in instructions is quite small, usually much smaller than the bit-width of the instruction. Accordingly, floating point instructions may not be able to accurately specify floating point immediate values in immediate value fields of small bit-widths. Therefore, the floating point constants/immediate values are conventionally loaded directly from memory or formed in their entirety by customized instructions for generating the desired floating point constants. Some approaches may also include hard-coding specific floating point values such as 0.0, 1.0, and 2.0 in registers. As can be recognized, such conventional techniques for generating floating point constants result in increased latency, increased code size, and/or increased hardware.

Accordingly, there is a need in the art for overcoming the aforementioned limitations associated with floating point constants immediate values for floating point instructions.

SUMMARY

Exemplary embodiments of the invention are directed to systems and method for generating a floating point constant value from an instruction.

For example, an exemplary embodiment is directed to a method of generating a floating point constant value from an instruction comprising: decoding a first field of the instruction as a sign bit of the floating point constant value; decoding a second field of the instruction to correspond to an exponent value of the floating point constant value; decoding a third field of the instruction to correspond to the significand of the floating point constant value; and combining the first field, the second field, and the third field to form the floating point constant value. Optionally, the second field and the third field may be shifted by first and second shift values respectively before the fields are combined to form the floating point constant value.

Another exemplary embodiment is directed to an instruction for generating a floating point constant value, wherein the instruction comprises: a first field corresponding to a sign bit of the floating point constant value; a second field corresponding to an exponent value of the floating point constant value; and a third field corresponding to a significand of the floating point constant value.

Yet another exemplary embodiment is directed to a system for generating a floating point constant value from an instruction comprising: means for decoding a first field of the instruction as a sign bit of the floating point constant value; means for decoding a second field of the instruction to correspond to an exponent value of the floating point constant value; means for decoding a third field of the instruction to correspond to a significand of the floating point constant value; and means for combining the first field, the second field, and the third field to form the floating point constant value.

Another exemplary embodiment is directed to a non-transitory computer-readable storage medium comprising code, which, when executed by a processor, causes the processor to perform operations for generating a floating point constant value from an instruction, the non-transitory computer-readable storage medium comprising: code for decoding a first field of the instruction as a sign bit of the floating point constant value; code for decoding a second field of the instruction to correspond to an exponent value of the floating point constant value; code for decoding a third field of the instruction to correspond to a significand of the floating point constant value; and code for combining the first field, the second field, and the third field to form the floating point constant value.

BRIEF DESCRIPTION OF THE DRAWINGS

The accompanying drawings are presented to aid in the description of embodiments of the invention and are provided solely for illustration of the embodiments and not limitation thereof.

DETAILED DESCRIPTION

Figure 1A:
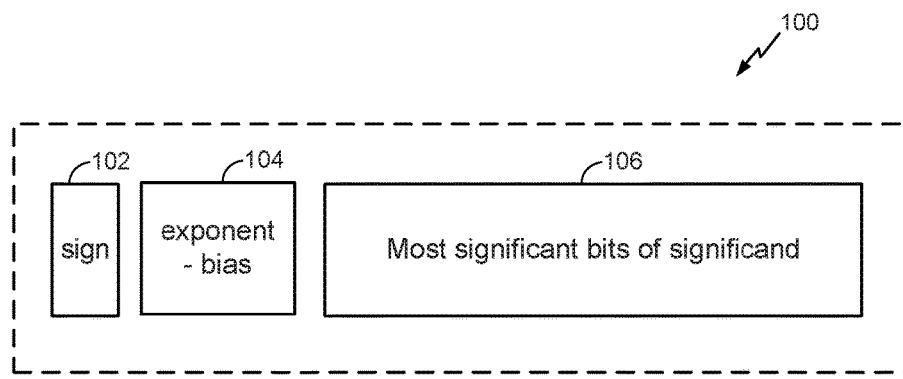
FIG. 1A illustrates a floating point immediate field according to an exemplary embodiment

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequences of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

Exemplary embodiments are directed to generating commonly encountered floating point values using preexisting architecture for integer pipelines in processing systems. Embodiments include one or more instructions to specify floating point constants, for example in immediate value fields of the instruction. One or more subfields within the immediate value field may comprise information such as sign, significand, bias, and exponent values corresponding to the specified floating point constant. The subfields may be extracted and assembled appropriately to generate the specified floating point constant.

One of ordinary skill in the art will recognize conventional formats for representing floating point numbers. In general, a floating point number may include a sign bit to indicate the sign (positive/negative) of the floating point number. The floating point number also includes a number of bits corresponding to a significand (also known as "mantissa"), which comprises the significant digits (e.g. digits not including leading zeros) of the floating point number. In general, the number of bits of significand relates to the precision that the floating point number can represent. The significand is raised by an exponent value specified in the floating point number, with an assumed base, to provide the magnitude of the floating point number. For example, the assumed base is 2 for binary numbers and the assumed base is 10 for decimal numbers. In mathematical notation, the value of the floating point number is derived by the formula significand*base^exponent with the appropriate sign.

Sometimes the exponent value may be offset by a specified or assumed bias value in order to shift the range of the exponent. In conventional implementations, a bias value may be added to the exponent value extracted from the floating point number in order to obtain the actual exponent value. Further, a radix point within the significand may be explicitly specified in a predetermined format. However, in conventional implementations, the radix point is assumed to be placed at a fixed position in the significand, and the exponent value is adjusted appropriately to achieve the floating nature of the radix point. For example, a decimal radix point may be uniformly specified to be placed after the most significant digit of the significand, such that the decimal number 12.3×10^10 may be represented as 1.23×10^11 by shifting the radix point to be placed after the most significant digit of the significand and increasing the exponent value appropriately.

Standard formats, such as the IEEE-754 standard, for representing floating point numbers with the above-described fields are well known in the art. The IEEE-754 standard includes a single precision and double precision standard for floating point numbers used in modern processing systems. Basically, the single precision format comprises 32-bit binary floating point numbers, including a sign bit, a 23-bit significand field and an 8-bit exponent field with a bias value of 127. The double precision format comprises 64-bit binary floating point numbers including a sign bit, a 52-bit significand field, and an 11-bit exponent field with a bias value of 1023. While various other provisions of the IEEE-754 standard will not be described in detail herein, it will be understood that exemplary embodiments may be compatible with the IEEE-754 standard for both single precision and double precision formats.

For example, exemplary embodiments may include instructions, "SFMAKE" and "DFMAKE" to generate single precision and double precision floating point values for use as floating point constants. These instructions may be used to generate a large set of floating point values that may be commonly encountered, for example, in applications related to digital signal processors, microprocessors, or other general purpose processors.

In an illustrative embodiment, an exemplary instruction specifying an 11-bit floating point immediate field, may be recognized as comprising a sign bit, a 6-bit significand field, and a 4-bit exponent field. A predetermined bias value may be applied based on whether the floating point constant value is represented in single precision or double precision. In this illustration, a bias value of 6 may be assumed to be applicable. This exemplary instruction may be used to generate floating point numbers belonging to a wide range of constants notated by: [+, −] [1.0, 1+63/64]*2^[−6, +9]. For example, within this range of constants can be generated all positive and negative integers of a range of magnitudes: [1, 128]. Further, within the range of constants, can be generated, all positive and negative even integers of magnitudes: [2, 256]. Positive and negative integers of magnitude 1000 can also be generated. Many commonly used fractional values (both positive and negative), of magnitudes such as 0.25, 0.5, 1/32 (and numerous multiples thereof), 1.5, 1/256, etc can also be generated. Skilled persons will recognize numerous other floating point constant values that are covered by the range of constants in the exemplary instruction.

With reference now to FIG. 1A, an exemplary format of the floating point immediate field as described above is illustrated. Field 100 may represent the floating point immediate field (e.g. of size, 11 bits, as described above). As shown, field 100 may comprise a sign bit in first field 102. Second field 104 may comprise an exponent value (e.g., of size, 4 bits). Alternately, as described above, second field 104 may comprise an exponent value which includes a bias, to which a bias constant based on desired precision (e.g. the value 6, as in the above description) may be added in order to compensate for the bias included in the exponent value. Third field 106 may comprise a significand (e.g. of size, 6 bits). In some implementations, third field 106 may comprise only the most significant bits of the significand of the corresponding floating point constant.

With continuing reference to FIG. 1A, first field 102, second field 104, and third field 106 may be decoded or extracted from a floating point instruction comprising a floating point immediate field in field 100. The decoded fields (with an appropriate bias included in second field 104) may be combined appropriately to generate the corresponding floating point constant value specified in the floating point immediate instruction.

Figure 1B:
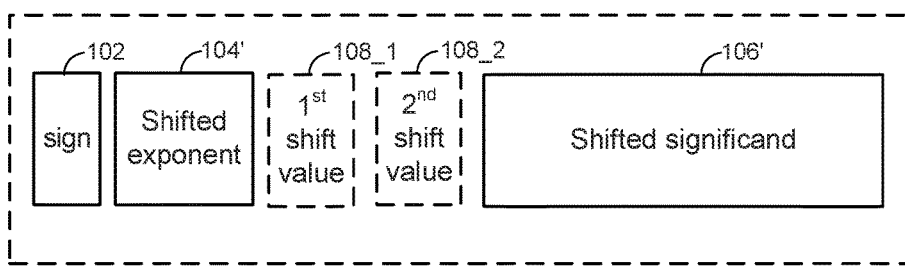
FIG. 1B illustrates optional first and second shift amounts applied to the exponent and significand fields of the floating point immediate field of FIG. 1A.

With reference now to FIG. 1B, optional shift amounts may be applied to second field 104 and third field 106. Second field 104 and third field 106 may be shifted by amounts as indicated by first and second shift values 108_1 and 108_2 as shown in FIG. 1B, to form shifted fields 104' and 106' respectively. The first and second shift values 108_1 and 108_2 may be included in floating point immediate field 100, for example in fourth and fifth fields respectively. Predetermined constant values (not shown) may be added to shifted fields 104' and 106' in order to generate the specified floating point constant value. Accordingly, through the additional steps of shifting and adding to a constant value, the precision of the floating point constant value may be altered. For example, only the most significant bits of significand may be included in third field 106, and these most significant bits may be shifted by an appropriate shift amount in order to generate floating point constant values of single precision or double precision, corresponding to the IEEE-754 standard. The exponent value with optional bias in second field 104 may also be similarly shifted based on desired precision or based on particular applications. In one example, the appropriate shift amount indicated by first and second shift values 108_1 and 108_2 may be based on whether the instruction to generate floating point constant values is an aforementioned SFMAKE instruction or a DFMAKE instruction. In other embodiments, a single shift field may be included in floating point immediate field 100, and may be applied to either or both the second field 104 and the third field 106.

Accordingly, exemplary embodiments may include one or more instructions to generate commonly used floating point constant values, without requiring the floating point constant values to be loaded from memory. Disclosed embodiments avoid polluting the memory and caches with floating point constant values. Accordingly, the embodiments also lead to low power implementations for generating floating point constant values. The embodiments may be used in operations such as division, computations of square-roots, etc. A wide range of commonly used constants may be supported. The embodiments may fully support single or double precision formats and may be compatible with conventional standards for representing floating point numbers.

Figure 2:
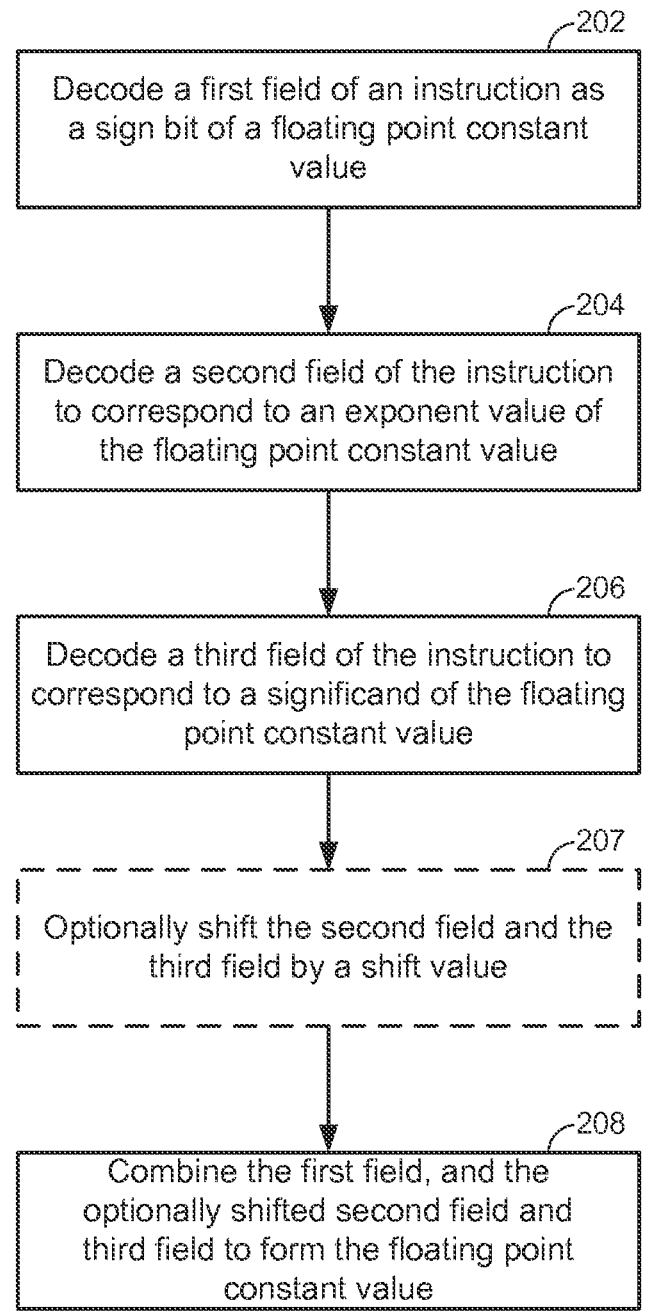
FIG. 2 is a flowchart illustration of a method of generating a floating point constant value from an instruction, according to exemplary embodiments.

Further, it will be appreciated that embodiments include various methods for performing the processes, functions and/or algorithms disclosed herein. For example, as illustrated in FIG. 2, an embodiment can include a method of generating a floating point constant value from an instruction comprising: decoding a first field (e.g. 102) of the instruction as a sign bit of the floating point constant value—Block 202; decoding a second field (e.g. 104) of the instruction to correspond to an exponent value of the floating point constant value—Block 204; decoding a third field (e.g. 106) of the instruction to correspond to a significand of the floating point constant value—Block 206; optionally shifting the second field and the third field by first and second shift values (e.g. 108_1 and 108_2)—Block 207; and combining the first field, and the optionally shifted second field and third field to form the floating point constant value—Block 208.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor.

Accordingly, an embodiment of the invention can include a computer readable media embodying a method for generating a floating point constant value from an instruction. Accordingly, the invention is not limited to illustrated examples and any means for performing the functionality described herein are included in embodiments of the invention.

Figure 3:
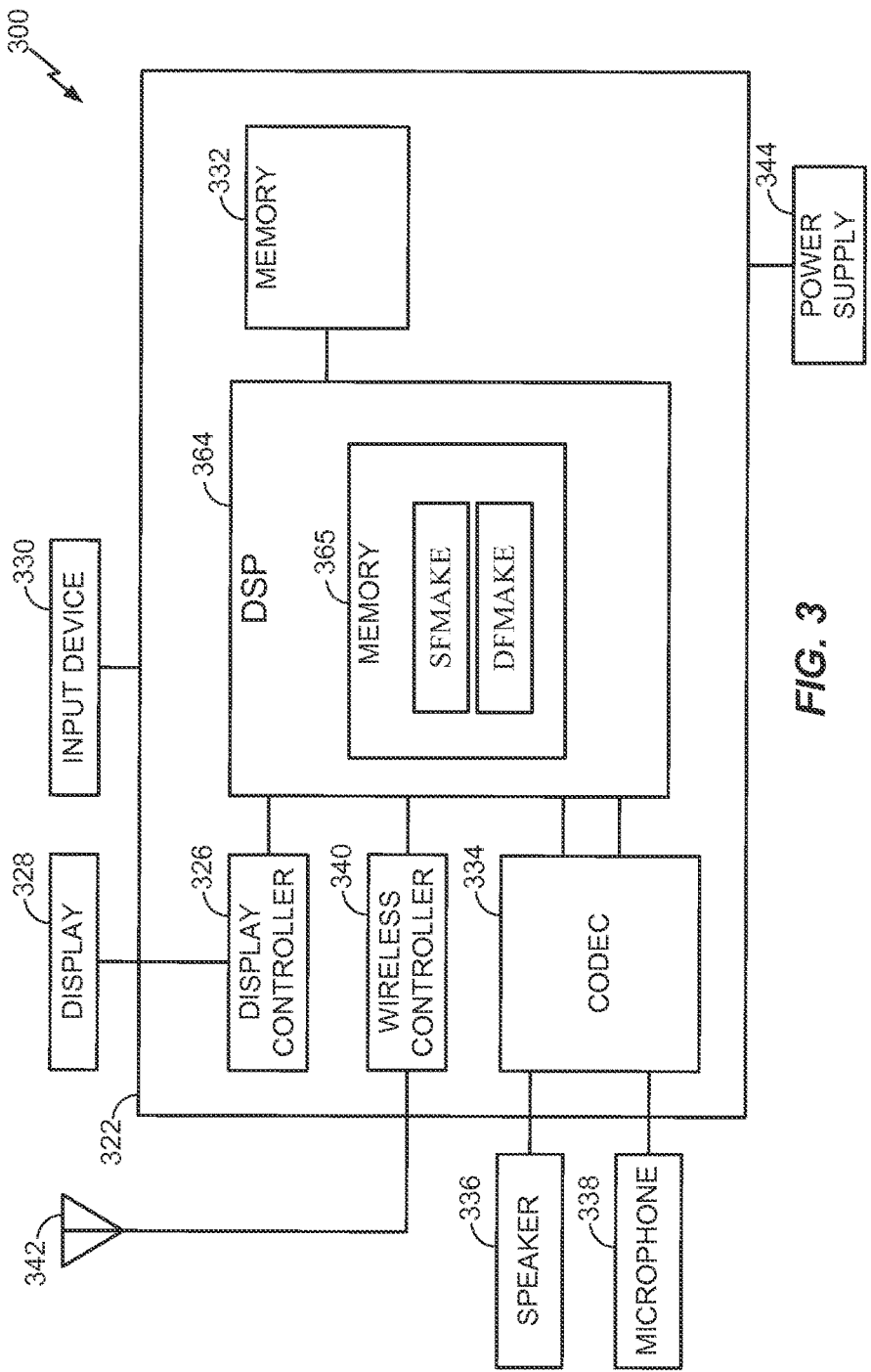
FIG. 3 illustrates an exemplary wireless communication system 300 in which instructions for generating floating point constant values according to exemplary embodiments may be advantageously employed.

Referring to FIG. 3, a block diagram of a particular illustrative embodiment of a wireless device that includes an instruction for generating floating point constant values according to exemplary embodiments is depicted and generally designated 300. The device 300 includes a processor, such as digital signal processor (DSP) 364. DSP 364 may include memory 365 which may comprise the aforementioned SFMAKE/DFMAKE instructions. FIG. 3 also shows display controller 326 that is coupled to DSP 364 and to display 328. Coder/decoder (CODEC) 334 (e.g., an audio and/or voice CODEC) can be coupled to DSP 364. Other components, such as display controller 326 (which may include a video CODEC and/or an image processor) and wireless controller 340 (which may include a modem) are also illustrated. Speaker 336 and microphone 338 can be coupled to CODEC 334. FIG. 3 also indicates that wireless controller 340 can be coupled to wireless antenna 342. In a particular embodiment, DSP 364, display controller 326, memory 332, CODEC 334, and wireless controller 340 are included in a system-in-package or system-on-chip device 322.

In a particular embodiment, input device 330 and power supply 344 are coupled to the system-on-chip device 322. Moreover, in a particular embodiment, as illustrated in FIG. 3, display 328, input device 330, speaker 336, microphone 338, wireless antenna 342, and power supply 344 are external to the system-on-chip device 322. However, each of display 328, input device 330, speaker 336, microphone 338, wireless antenna 342, and power supply 344 can be coupled to a component of the system-on-chip device 322, such as an interface or a controller.

It should be noted that although FIG. 3 depicts a wireless communications device, DSP 364 and memory 332 may also be integrated into a set-top box, a music player, a video player, an entertainment unit, a navigation device, a personal digital assistant (PDA), a fixed location data unit, or a computer. A processor (e.g., the DSP 36.4) may also be integrated into such a device.

The foregoing disclosed devices and methods are typically designed and are configured into GDSII and GERBER computer files, stored on a computer readable media. These files are in turn provided to fabrication handlers who fabricate devices based on these files. The resulting products are semiconductor wafers that are then cut into semiconductor die and packaged into a semiconductor chip. The chips are then employed in devices described above.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of generating a floating point constant value from a floating point instruction, the method comprising:
   decoding a first field of an immediate field of the floating point instruction as a sign bit of the floating point constant value;
   decoding a second field of the immediate field of the floating point instruction to correspond to an exponent value of the floating point constant value;
   decoding a third field of the immediate field of the floating point instruction to correspond to a significand of the floating point constant value;
   shifting the second field, based on a first shift value, and the third field, based on a second shift value; and
   combining the first field, the shifted second field, and the shifted third field to generate the floating point constant value,
   wherein a fourth field of the immediate field of the floating point instruction comprises the first shift value and a fifth field of the immediate field of the floating point instruction comprises the second shift value.

2. The method of claim 1, wherein the exponent value includes a bias.

3. The method of claim 2, further comprising adding the exponent value to a bias constant to compensate for the bias included in the exponent value.

4. The method of claim 1, wherein the floating point constant value is formed according to one of IEEE 754 single precision or double precision format.

5. The method of claim 1, wherein the third field comprises most significant bits of the significand of the floating point constant value.

6. The method of claim 1, further comprising adding predetermined constant values to the shifted second field and the shifted third field.

7. The method of claim 1, wherein the floating point constant value is generated from the floating point instruction without loading any floating point constant values from memory.

8. The method of claim 1, wherein a shift amount indicated by the first shift value and/or a shift amount indicated by the second shift value are based on whether the floating point constant value generated from the floating point instruction is to be a single precision or a double precision floating point constant value.

9. A non-transitory computer-readable storage medium comprising code, which, when executed by a processor, causes the processor to perform operations for generating a floating point constant value from a floating point instruction, wherein the floating point instruction comprises an immediate field, the immediate field comprising:
   a first field corresponding to a sign bit of the floating point constant value;
   a second field corresponding to an exponent value of the floating point constant value;
   a third field corresponding to a significand of the floating point constant value;
   a fourth field comprising a first shift value; and
   a fifth field comprising a second shift value; the non-transitory computer-readable storage medium comprising:
   code for shifting the second field, based on the first shift value, and the third field, based on the second shift value; and
   code for combining the first field, the shifted second field, and the shifted third field to generate the floating point constant value.

10. The non-transitory computer-readable storage medium of claim 9 further comprising code for adding predetermined constant values to the shifted second field and the shifted third field.

11. The non-transitory computer-readable storage medium of claim 9, wherein the floating point constant value is generated from the floating point instruction without loading any floating point constant values from memory.

12. The non-transitory computer-readable storage medium of claim 9, wherein a shift amount indicated by the first shift value and/or a shift amount indicated by the second shift value are based on whether the floating point constant value generated from the floating point instruction is to be a single precision or a double precision floating point constant value.

* * * * *